March 16, 1965 A. C. SAMPIETRO ETAL 3,173,407
ALUMINUM ENGINE
Filed Aug. 17, 1961 8 Sheets-Sheet 1

INVENTORS
Achilles C. Sampietro
Kenneth G. Matthews
BY
Harness, Dickey & Pierce
ATTORNEYS March 16, 1965 A. C. SAMPIETRO ETAL 3,173,407
ALUMINUM ENGINE
Filed Aug. 17, 1961 8 Sheets-Sheet 3

INVENTORS.
Achilles C. Sampietro
Kenneth G. Matthews.
BY
Harness, Dickey & Pierce.
ATTORNEYS.

March 16, 1965    A. C. SAMPIETRO ETAL    3,173,407
ALUMINUM ENGINE Filed Aug. 17, 1961      8 Sheets-Sheet 6

INVENTORS.
Achilles C. Sampietro
Kenneth G. Matthews
BY
Harness, Dickey & Pierce
ATTORNEYS

United States Patent Office 3,173,407
Patented Mar. 16, 1965

3,173,407
ALUMINUM ENGINE
Achilles C. Sampietro, Birmingham, and Kenneth G. Matthews, Grosse Pointe Woods, Mich., assignors to Kaiser Jeep Corporation, a corporation of Nevada
Filed Aug. 17, 1961, Ser. No. 132,226
14 Claims. (Cl. 123—41.74)

This invention relates to an improved construction and method of manufacture for an internal combustion engine.

The internal combustion engine of this invention utilizes an engine block constructed of an aluminum alloy or an alloy of some similar lightweight metal such as magnesium. When constructing an engine block of an aluminum alloy, it is desirable that structural threaded connections with the block be eliminated since such threads do not have the strength of similar threads in a block made of some ferrous metal, such as cast iron; therefore, it is an object of this invention to provide an internal combustion engine having an engine block of an aluminum alloy or the like whereby structural connections to the aluminum block by means of threads in the block are eliminated and in which structural connections are made by means independent of the block material.

It is also desired in an internal combustion engine having an engine block of an aluminum alloy or the like that the construction be such that the cylinder walls should not be used as a load-carrying member for loads relative to the cylinder head and the engine block. With such a construction, the wall thickness of the cylinder walls can be held to a minimum, thereby realizing a savings in weight and material and, hence, cost. Thus it is another object of this invention to provide an internal combusion engine having a cylinder block of an aluminum alloy or the like whereby the cylinder walls are not used as load-carrying members for loads relative to the cylinder head and engine block.

It is current practice to die cast engine blocks of aluminum alloy by pulling the die out from the top of the cylinder bores and casting at the same time vertical walls to constitute the water jacket. By so die casting, the minimum thickness of the water jacket walls and cylinder walls is determined by die casting procedures inherent in that method of die casting. Therefore, it is an object of this invention to provide a novel method for die casting an engine block of an aluminum alloy having a construction permitting the formation of thinner cylinder walls and the use of a water jacket of thinner wall construction.

In many engine constructions it is also required that the water jacket walls themselves be load-carrying members and thus be of sufficient strength, and hence, thickness, to so carry a load. It is an object of this invention to provide a novel construction for an internal combustion engine whereby the water jacket walls are not used as load-carrying members.

Other objects, features, and advantages of the present invention will become apparent from the subsequent description and the appended claims, taken in conjunction with the accompanying drawings, in which:

FIGURE 1 is a side elevational view with some parts broken away and some parts shown in section of an engine assembly embodying the features of this invention;

FIGURE 8 is a fragmentary top elevational view of the engine block of the engine assembly shown in FIGURE 7;

While this invention is shown specifically in conjunction with an in-line six cylinder engine, it is to be understood that the principles as set forth are not necessarily restricted to that type of engine.

Looking now to FIGURES 1–4, an internal combusion engine, generally designed by the numeral 20, comprises a cylinder head assembly 22, an engine block assembly 24, and a plurality of bearing block assemblies 26, all vertically joined or clamped together in a sandwich-type arrangement by means of a plurality of studs. The studs are threaded at opposite extremities and the sandwich is clamped together by tightening nuts disposed at each extremity. The studs represent the primary means by which the cylinder head assembly 22, the engine block assembly 24 and the bearing block assembly 26 are retained together; thus, no threads are required for structural purposes in the engine block and the loads are carried by the studs themselves.

Figure 2:
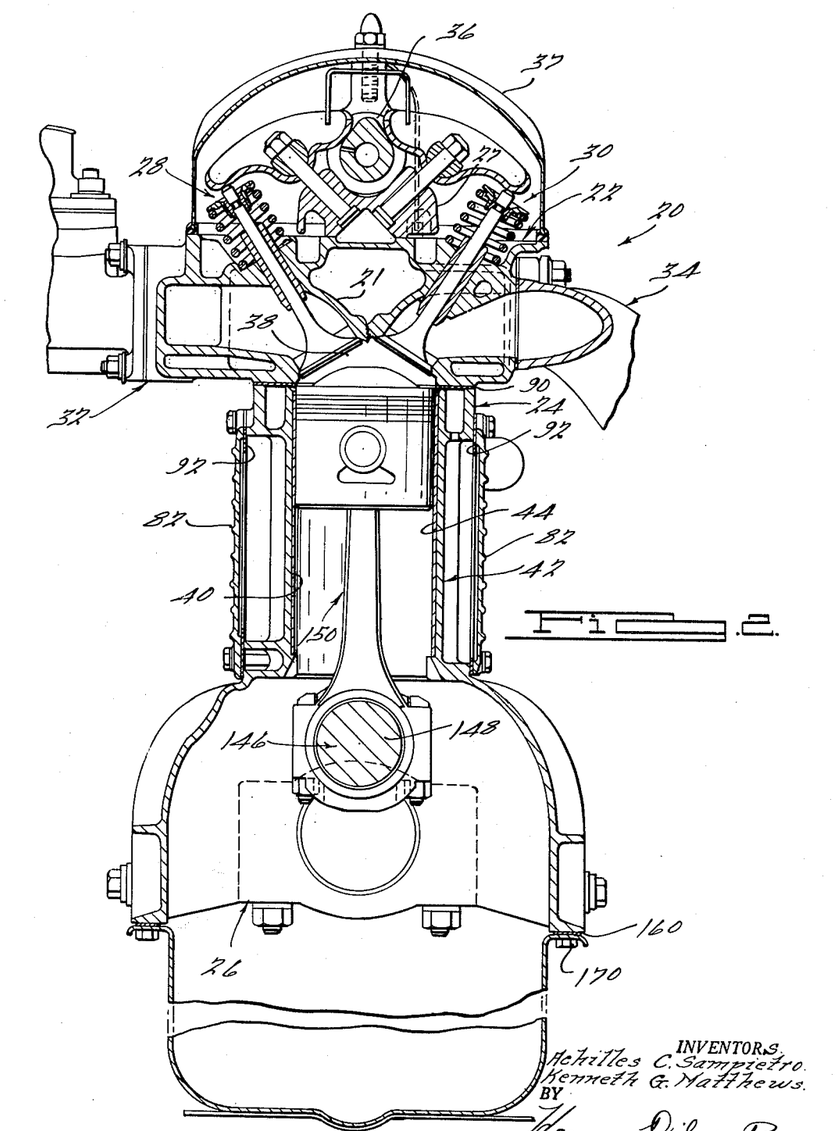
FIGURE 2 is a sectional view taken substantially along the line 2—2 of FIGURE 1.

More specifically now and looking to FIGURE 2, the internal combustion engine 20 is of an overhead valve type construction with the cylinder head assembly 22 comprising a cylinder head 21 and, associated therewith by means known in the art, intake and exhaust valve assemblies, generally designated by the numerals 28 and 30, respectively. The intake and exhaust valve assemblies 28 and 30 comprise the usual valve, valve spring and rocker arm and are individual to intake and exhaust manifold assemblies 32 and 34, respectively, which are secured to the cylinder head 21 in a conventional manner. The rocker arms are rockably secured to a rocker arm bracket support 27 which is attached to the cylinder head 21 in a manner to be described. Each of the plurality of intake valve assemblies 28 and exhaust valve assemblies 30 is associated with a corresponding one of a plurality of combustion chambers 38 which are disposed in the cylinder head 21.

The rocker arms associated with the valve assemblies 28 and 30 are driven by an overhead cam shaft 36 which, in turn, is driven by the internal combustion engine 20 by means well known in the art. A cover plate 37 is secured to and covers the top portion of the cylinder head assembly 32, thereby protecting the cam shaft 36, and the associated intake and exhaust valve assemblies 28 and 30, from dirt, etc. The cylinder head assembly 22 has a plurality of vertically extending bores 29 and 31 which, at their outer extremities, extend through relatively flat shoulder portions 33 and 35, respectively (see FIGURE 3).

Each of the plurality of combustion chambers 38 is individual to one of a plurality of cylinder bores 40 disposed in the engine block assembly 24. The engine block assembly 24 is comprised of an aluminum alloy engine block 42 into which has been cast at its upper end a plurality of vertically extending cylinder bores 40; since, however, the engine block 42 is constructed of an aluminum alloy, the cylinder bores 40 are provided with an internal lining 44 of cast iron or some other more durable metal. It is common practice to cast the cylinder bore 40 around the lining 44.

The engine block 42 has at its upper extremity a generally rectangularly shaped rim portion 45 terminating in a relatively flat faced surface 46 (FIGURE 4) which is matable with a similar planar surface 47 (FIGURE 3) on the cylinder head 21. The upper rim portion 45 has a plurality of inwardly extending bosses 48 having vertical bores 50 extending therethrough. Located interiorly of the engine block 52 and spaced vertically from the flat faced portion 46 is a flat web portion 52 which externally interconnects each of the plurality of cylinder bores 40 and is connected to the rim portion 45. The web portion 52 has a plurality of holes 54 and slots 56 extending therethrough for a purpose to be described.

The plurality of cylinder bores 40 are also externally interconnected at their vertically lower extremities by a generally rectangularly shaped lower web portion 58 (FIGURE 1). The web portion 58 is integral with an outwardly extending semi-circularly shaped crankcase portion 60. Internally, the crankcase portion 60 comprises a plurality of bays 62 individual to each of the cylinder bores 40. Each bay is disposed between a pair of a plurality of vertically downwardly extending rib portions 64 with each of the rib portions 64 adapted to receive one of the plurality of bearing block assemblies 26. The rib portions 64 extend transversely across the width of the crankcase portion 60 and have located therein a pair of vertically extending spaced bores 66 which are in axial alignment with and individual to ones of the plurality of bores 50 disposed in the bosses 48 in the upper rim portion 45. Each of the bores 66 have enlarged diameter bore portions 67 for a purpose to be described. On the outside surface of the crankcase portion 60 is located a plurality of pairs of vertically downwardly extending ribs 68 (see FIGURE 1) which are substantially disposed in alignment with the internal rib portions 64 and hence are in alignment with the location of the bearing block assemblies 26. These ribs are included to lend strength and rigidity to the engine block 42. The plurality of pairs of ribs 68 are interconnected by a longitudinally extending rib 70 and diagonally extending ribs 72. The plurality of pairs of ribs 68 are integral with inwardly extending boss portions 74 (FIGURES 1 and 3) having a bore 76 extending therethrough for a purpose to be described.

A longitudinally extending slot 78 is cast or otherwise formed in the external portion of one side of the web portion 58. A plurality of bores 80 communicate the slot 78 with the enlarged bore portions 67 of each of the bores 66 on that side of the engine block 42. A pair of thin ribbed water jacket members 82 are secured to both sides of the engine block 42 by means of a plurality of bolts 84 threadably engaged with the upper rim portion 45 and the lower web portion 58. Note that, while the bolts 84 are threadably engaged with the aluminum alloy engine block 42, it is not for the purpose of sustaining loads but simply to secure the thin water jackets which in the preferred embodiment are made of aluminum alloy, and which, as will be seen, are not structural members. The upper web portion 52 and the lower web portion 58, along with the water jacket members 82, define therein an enclosed chamber for holding the engine coolant. Looking to FIGURE 1, it can be seen that this chamber provides circulation of the coolant peripherally about the plurality of cylinder bores 40. The portion of the engine assembly 20 above the upper web portion 52 is in fluid communication with the enclosed chamber just described by means of the plurality of holes 54 and slots 56 in the upper web portion 52. Looking now to FIGURE 1, coolant can be pumped into the cylinder head assembly 22 by conventional means (not shown) through an inlet pipe 86 and into a passageway 88 disposed in the cylinder head assembly 22. The passageway 88 leads to the usual cooling chambers in the cylinder head assembly 22 for cooling the combustion chambers 38 and is in communication, by means known in the art, with the enclosed area about the cylinder bores 40 previously described. The coolant is exhausted from the above described chambers by means (not shown) back to the water pump (not shown).

The surface 47 of the cylinder head 21 is separated from the mating, planar surface 46 on the rectangular upper rim portion 45 of the engine block 42 by means of a gasket 90 which prevents leakage of the coolant therebetween; likewise, a pair of gaskets 92 are inserted between the water jacket members 82 and the engine block 42 to prevent the coolant from leaking therebetween.

The internal rib portions 64 have a thin center portion 94 (FIGURE 3) blending into and integral with thicker outer portions 96 through which the bores 66 and 67 extend. The thicker outer portions 96 generally define a rectangular opening 98 for matably receiving one of the plurality of bearing block assemblies 26. Each of the bearing block assemblies 26 comprises an upper bearing block member 100 and a lower bearing cap member 102 which are retained together in a manner to be described and which define at their ends a generally rectangular shape matable with the generally rectangular cavity 98. The bearing block member 100 and bearing cap member 102 are made of cast iron or other similarly hard and durable material for a purpose to be readily apparent. The center portion of the upper bearing block 100 and the bearing cap member 102 extends arcuately outwardly. The thin center portion 94 of the internal rib portion 64 is relieved such that the upper bearing block member 100 engages the upper rib portion 64 only at the thick outer portions 96.

The upper bearing block member 100 and the lower bearing cap 102 have pairs of aligned bores 104 and 106, respectively, for a purpose to be described. When each of the bearing block assemblies 26 is properly fitted within the rectangularly shaped aperture 98, the bores 104 and 106 are at axial alignment with the bores 67 and 66 in the thick outer portion 96 of the internal rib portion 64 and are therefore also in alignment with individual ones of the plurality of bores 50 in the upper rim portion 45 and with individual ones of the bores 29 and 31 in the cylinder head 21.

Figure 3:
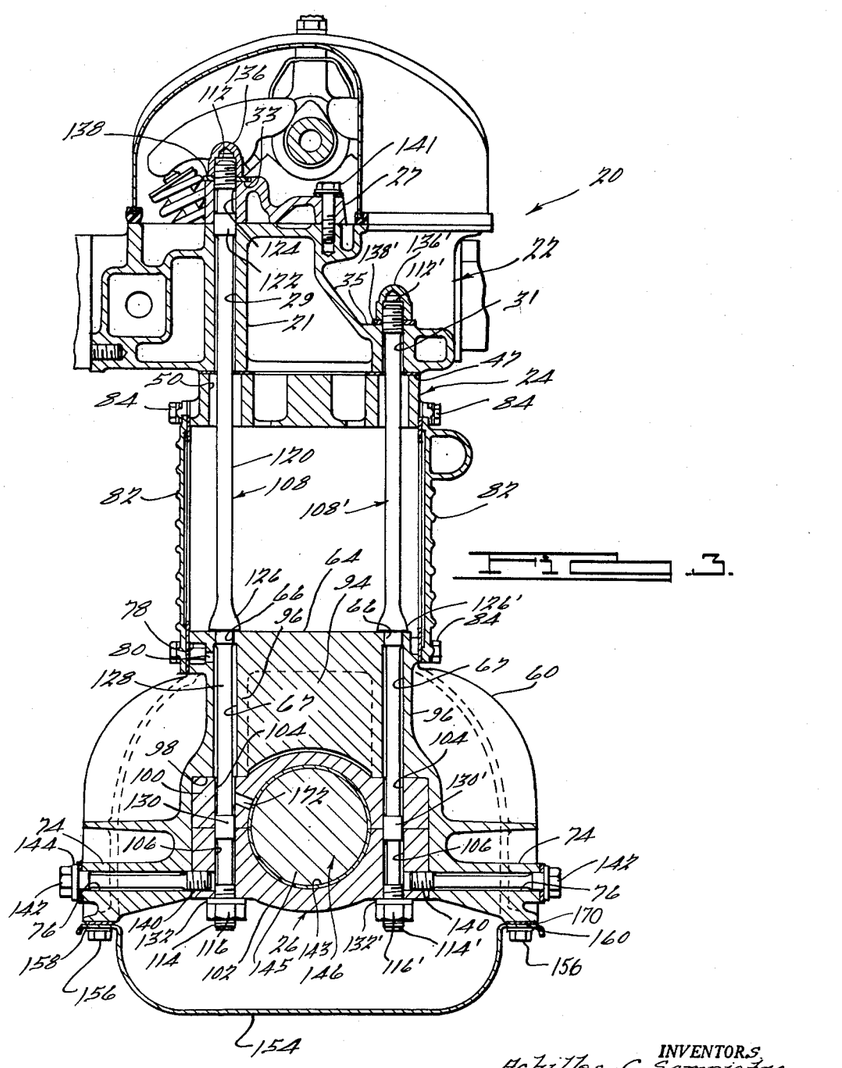
FIGURE 3 is a sectional view taken substantially along the line 3—3 of FIGURE 1.
Figure 4:
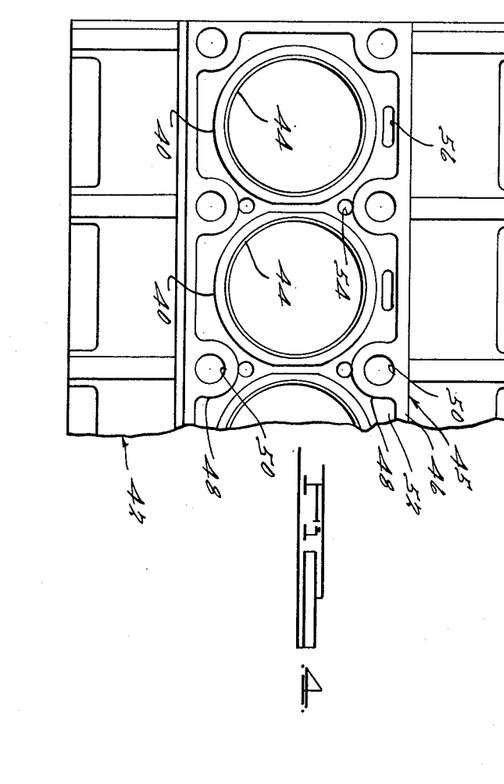
FIGURE 4 is a fragmentary top elevational view of the engine block shown in the engine assembly of FIGURE 1.

Disposed in each of the bores in the plurality of bearing block assemblies 26 and in the engine block 42 which are in alignment with and individual to one of the bores 29 in the cylinder head 21 is a stud 108 (FIGURE 3). Disposed in each of the bores in the plurality of bearing block assemblies 26 and the engine block 42 which are in alignment with and individual to the bores 31 in the cylinder head 21 is another similarly constructed stud 108'. The studs 108 and 108' are threaded at the opposite extremities 112, 114 and 112', 114', respectively.

The stud 108 has a first shank portion 120 of a diameter less than that of the bore 29 and passes through the bore 29 and terminates therein in an enlarged diameter portion 122 which is of substantially the same diameter as the bore 29. The enlarged diameter portion 122 is located at the juncture between the rocker arm bracket support 27 and the top portion of the cylinder head assembly 22 such as to provide a seal at that juncture. The remainder of the stud 120 at that end passes through a bore 124 in the rocker arm bracket support with the threaded portion 112 extending partially outwardly therefrom. The other end of the shank portion 120 terminates in an enlarged head portion 126 which bears against the thicker outer portion 96 of the internal rib portion 66. The enlarged head portion 126 can be provided with a plurality of peripheral faces to be matable with a similarly faced groove or recess in the top surface of the internal rib portion 64 thereby preventing any tendency for rotation of the stud 108. Extending from the head portion 126 is a second shank portion 128 which is matable within the bore 66 and extends through the bore 67. The diameter of the bore 67 is somewhat larger than that of the shank portion 128, thus leaving a space therebetween for a purpose to be described. The shank portion 128 also extends through the bores 104 and 106 in the upper bearing block 100 and in the lower bearing cap 102, respectively, and has an enlarged diameter portion 130 which is disposed at the juncture of the upper bearing block member 100 and the lower bearing cap member 102, thereby closing off at that point the communicating bores 67 and 104, since the portion 130 is substantially of the same diameter as the bores 104, 106. The threaded portion 114 extends outwardly partially beyond the lower bearing cap member 102. A nut 116 engageable with the threaded portion 114 is tightened against a washer 132 and hence against the lower bearing cap member 102 and provides a clamping force with the enlarged head portion 126, thereby securely clamping the individual ones of the bearing block assemblies 26 to the rectangular aperture 98 of the internal rib portion 64. Likewise, a nut 136 is threadable on the threaded end 112 against a washer 138 and thereby secures the rocker arm bracket support 27 to the cylinder head 21 which in turn then is secured to the upper rim portion 45 of the engine block member 42. A pluarlity of studs 141 are also used to secure the rocker arm bracket support 27 to the cylinder head assembly 22 but these studs are not used to carry any appreciable load.

In a similar manner, the stud 108' has a nut 116' engageable with the threaded portion 114' and tightened against a washer 132' and hence against the lower bearing cap member 102 for providing a clamping force with an enlarged head portion 126' to further secure the individual ones of the bearing block assemblies 26 to the rectangular aperture 98 of the internal rib portion 64. Likewise, a nut 136' is threadable on the threaded end 112' against a washer 138' and thereby further secures the cylinder head 21 to the upper rim portion 45 of the engine block member 42. As with the stud 108, the stud 108' has an enlarged diameter portion 130' matably disposed in the bores 104, 106 at the juncture of the upper bearing block member 100 and the lower bearing cap member 102.

Each of the lower bearing cap members 102 has a pair of horizontally extending threaded bores 140 in alignment with the bores 76 in the boss portions 74. The threaded bores are engageable by a plurality of studs 142 passing through bores 76, each of which has a head portion bearing against the boss portions 74 via lockwashers 144 to further secure the bearing block assemblies 26 within the rectangular aperture 98 in the internal rib portions 64. The studs 142, by being so located, prevent the crankcase portion 60 from flexing outwardly, due to horizontal load components on the associated crankshaft.

Note that in the construction just described, while the studs 108 and 108' react the vertical engine load components there is no threaded engagement anywhere with the aluminum engine block 42 or any aluminum alloy member in which a component of the engine load is to be reacted. Also note that, since the load is substantially taken by the studs 108 and 108', the water jacket members 82 and also the walls of the cylinder bores 80 can be constructed of thin gauge, thereby providing a saving in material. Note that even the side loads on the crankshaft, while reacted against the aluminum crankcase, are not reacted through threads in the aluminum crankcase portion 60 but rather through threads in the lower bearing cap member 102 which is made of a stronger material, such as cast iron.

Each of the bearing block assemblies 26 has disposed therein a main bearing 143 for rotatably holding a journal 145 of a crankshaft 146. Secured to each of the throws 148 of the crankshaft 146 is a piston assembly 150 (FIGURE 2) which is of a conventional construction and comprises a piston head having the usual oil and pressure rings, connected to the small end of a connecting rod by a wrist pin, with the enlarged end of the connecting rod being connected to one of the throws of the crankshaft by means of a connecting rod cap and bearing inserts. An oil pan member 154 (FIGURE 3) is bolted by a plurality of bolts 156 and associated washers 158 to a flat face 160 at the bottom extremity of the crankcase portion 60 with a gasket member 170 sandwiched in between to provide a seal.

In order to provide lubrication to the main bearings 143, the transversely extending slot 78 is connected to the oil supply system (not shown) provided by means well known in the art. The enlarged bore 67 is in communication with the slot 78 via the bore 80, thereby providing an oil passageway to the upper bearing block member 100. This member is provided with a bore 172 which connects the bore 67 to the main bearing 143. Since the bore 67 is larger than the diameter of the shank 128 of stud 108, oil can pass from the oil pump through the oil gallery 78 through the bore 80, through the gap between the bore 67 and the shank 128, through the bore 172 and thence to the main bearing 143. Note that all of the passageways described save for the bore 172 in the upper bearing block member 100 can be cored within the engine block 42, thus eliminating the need for machining. The slot 78 forms the oil gallery by means of the water jacket member 82 located on the open side of the slot; a seal is provided therebetween to prevent leakage.

Thus the internal combustion engine assembly 20, as described, provides an engine block member 42 which requires only a minimum of machining and provides a construction in which no load-carrying connections are made by means of threads in the aluminum alloy engine block 42; also the water jacket members 82 and the walls of the cylinder bores 40 can be maintained thin, since the load is carried by the plurality of studs 108 and 108'.

Figure 5:
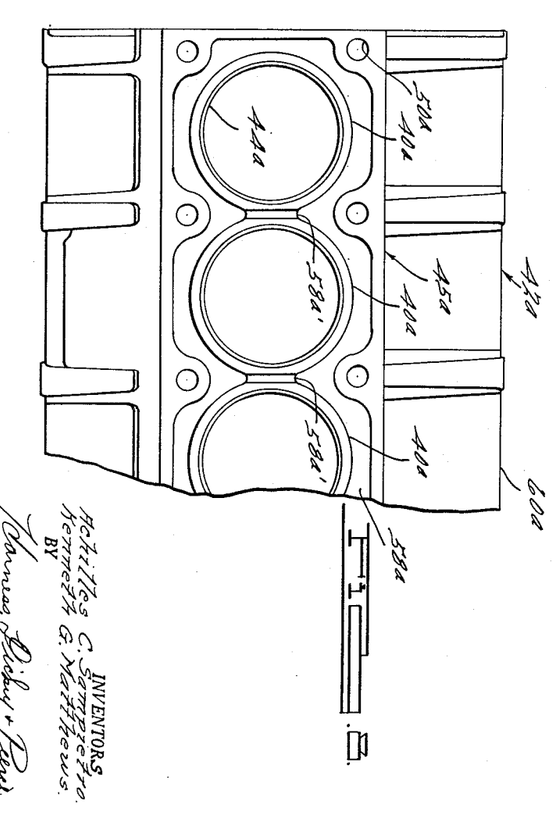
FIGURE 5 is a fragmentary view, with one portion of the engine block of FIGURES 1–4 shown in section, depicting the die casting of that engine block.
Figure 6:
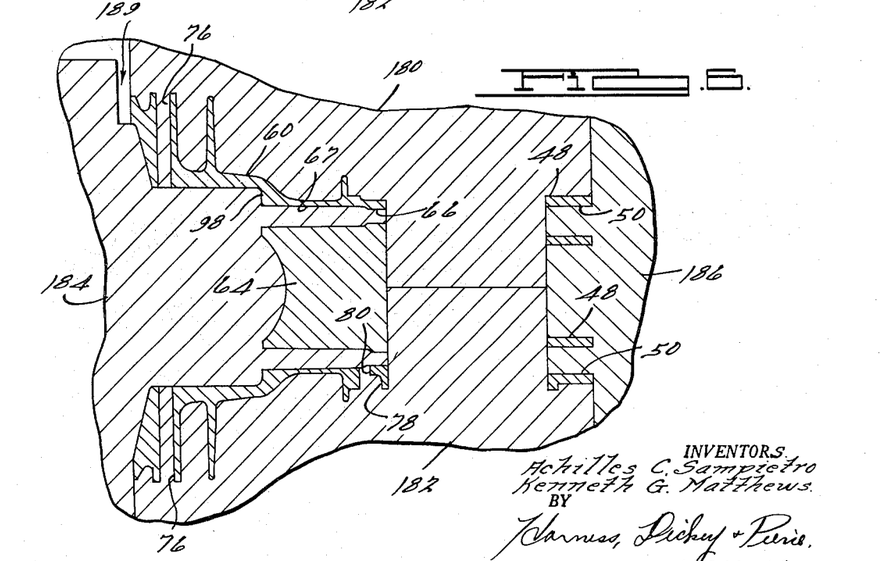
FIGURE 6 is a fragmentary view showing a different portion of the engine block as shown in FIGURES 1–4 in the die casting of that engine block.

The aluminum alloy engine block 42, as previously discussed, can be formed by a novel method and apparatus as shown in the FIGURES 5 and 6. It is customary in the die casting of aluminum engine blocks to form the cylinder bores and the water jacket by pulling the associated die from the top of the bores. The cylinder block 42 as shown and previously described, however, can be die cast by pulling the dies forming the cylinder bores and the water jacket area from the sides. By die casting the block 42 by the latter method, the walls of the cylinder bores can be cast thinner and also, thinner separate water jackets 82 can be provided.

Looking now specifically to FIGURES 5 and 6, an upper slide 180 and a lower slide 182 define the outer configuration of the cylinder bores 40 and the crankcase portion 60 with its associated ribbing; the oil gallery slot 78 with the associated apertures 80 and the bores 76 for receiving the plurality of studs 142 (FIGURE 3) are cored in the upper and lower slides 180 and 182, respectively. A stationary die section 184 cooperates with an ejector die section 186 to define the remainder of the die cast aluminum engine block 42. The stationary die section 184, which defines the internal portion of the engine block 42, has secured to it a die mandrel portion 188 on which is located the internal cylinder bore lining 44. The mandrel 188 positionally locates the lining 44 and cooperates with the upper slide 180 and the lower slide 182 to define the plurality of cylinder bores 40. The bore liner 44 of cast iron or the like is keyed in the proper position by means of keys 190 on the die mandrel 188. In the stationary die section 184 means are provided to core the bore 66 and the enlarged bore 67 which extend through the internal rib portion 64. The rectangularly shaped aperture or cavity 98 is also defined by the stationary section 184. The ejector die section 186 defines the upper rim portion 45 (FIGURE 5) and, together with the stationary die section 184, defines the upper web portion 52 while coring the holes 54 provided therein for coolant circulation. The ejector die section 186 also defines the plurality of bosses 48 and has cored therein the bores 50 extending therethrough.

In die casting the cylinder block as shown in FIGURES 5 and 6, the aluminum alloy is forced under pressure through a shot tube or gate, generally indicated by the numeral 189, until the cavity between the upper slide 180, the lower slide 182, the stationary die section 184 and the ejector die section 186 is filled. On completion of the operation, the upper and lower slides 180 and 182 are parted and the ejector die section 186 is moved outwardly, leaving the die cast aluminum engine block 42.

In addition to the other advantages previously enumerated, another advantage of die casting an engine block by pulling the dies and hence forming the cylinders from the sides, as described, is that the cooling passageways can be made to extend literally completely around the periphery of the cylinder bores 40.

Some of the features of this invention are equally applicable to a die cast aluminum alloy block in which the cylinder bores and water jackets have been cast by pulling the die out from the top.

Figure 7:
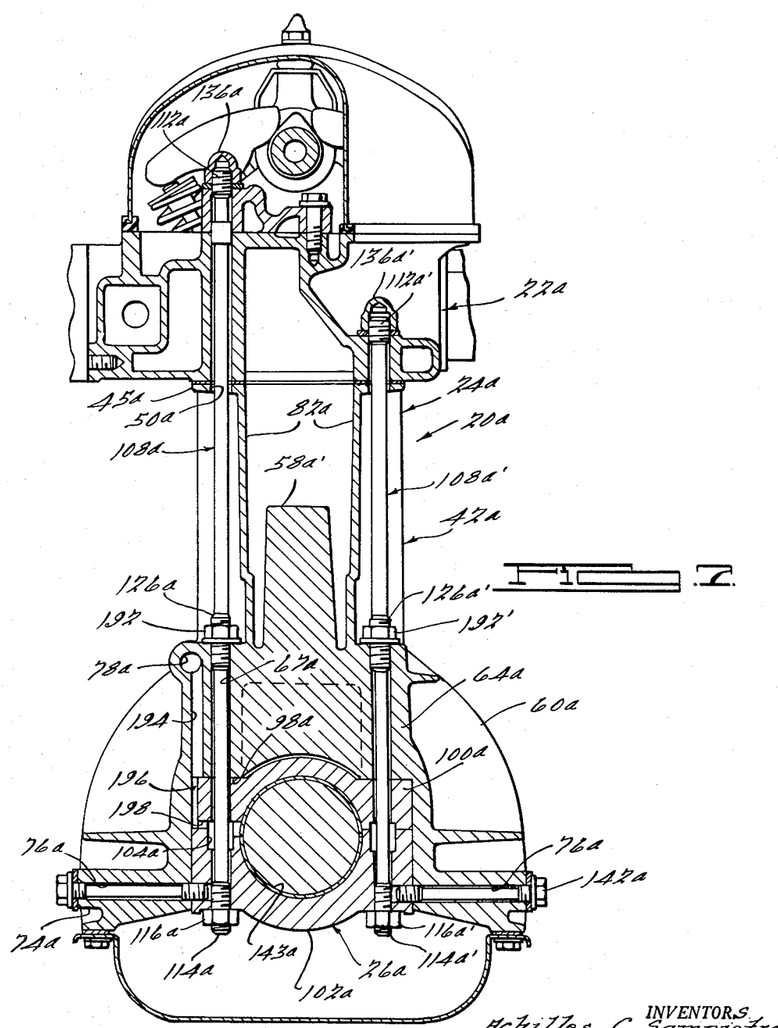
FIGURE 7 is a front elevational view, with some parts in section and some parts shown broken away, of a modified engine assembly embodying some of the features of this invention.

Looking now to FIGURE 7, a modified internal combustion engine assembly 20a is shown in which components similar to those in the previously discussed embodiment, as shown in FIGURES 1–4, are given similar numbers with the addition of the suffix "a." Thus the internal combustion engine assembly 20a comprises a cylinder head assembly 22a, an engine block assembly 24a and a plurality of bearing block assemblies 26a secured or clamped together by a plurality of studs 108a and 108a'. The studs 108a and 108a' have enlarged diameter threaded portions 126a and 126a', respectively, intermediate their ends upon which are secured a pair of nut and lock washer assemblies 192 and 192', respectively.

The engine block assembly 24a includes an aluminum alloy die cast engine block 42a which has integrally die cast water jacket walls 82a. The water jacket walls 82a terminate in an upper rim portion 45a (FIGURE 8) which has cast or cored therein a plurality of bores 50a through which the studs 108a and 108a' pass. Integrally with the engine block 42a are a plurality of cylinder bores 40a having cast therein liners 44a of cast iron or some other similar material. The plurality of cylinder bores 40a having cast therein liners 44a of cast iron or some other similar material. The plurality of cylinder bores 40a are externally connected at their vertically lower extremities to a generally rectangularly shaped web portion 58a which is integral with a crankcase portion 60a of the block 42a. Adjacent ones of the cylinder bores 40a are interconnected by vertically extending rib portions 58a'. Each of a plurality of transverse rib portions 64 in the engine block 42a define a recess 98a for matably receiving that one of the plurality of bearing block assemblies with which it is individual.

In the embodiment shown in FIGURES 7 and 8, since there is no web portion connecting the cylinder bores 40a at their upper ends similar to the web portion 52 (FIGURE 4) of the first embodiment, the water or coolant is free to circulate around the bores 48 without the necessity of holes and slots 54 and 56, respectively. However, note that with the vertical rib portion 58a', the coolant cannot circulate as completely around the periphery of the bores 40a in the block 42a as was possible with the previously discussed embodiment.

The studs 108a and 108a' have threaded portions 112a, 112a' and 114a, 114a', respectively, at opposite ends. In assembling the engine assembly 20a, nuts 136a and 136a' are disposed in threaded portions 112a and 112a', respectively, and nuts 116a and 116a' are threaded on portions 114a and 114a', respectively. When these have been tightened down and the nut and lock washer assemblies 192 and 192', respectively, have been secured, the engine assembly 20a is then thereby held or clamped together. Thus, as in the previously described embodiment shown in FIGURES 1–4, the vertical loads occurring within the engine assembly 20a are not taken by any threaded connection with the die cast aluminum alloy engine block 42a, but rather by the studs 108a and 108a'.

Since the water jackets 82a are cast integrally with the engine block 42a, the oil gallery 78a is longitudinally cored completely within the engine block 42a. In this construction, the enlarged bore 67a through which the stud 108a passes is not used for the oil passageway but a separate passageway 194 is cored to communicate with the longitudinal passageway 78a. Each of the bearing block assemblies 26a is similar to the bearing block assembly 26 of FIGURES 1–4 and comprises an upper bearing block member 100a and a lower bearing cap 102a for holding a main bearing member 143a. A pair of back-to-back counterbores in the bearing block member 100a and bearing cap 102a define a chamber 104a through which a portion of the stud 108a passes in clearance relationship. A groove 198 in that face of the upper bearing block 100a mating with the bearing cap 102a communicates the main bearing 143a with the bore 194 via the chamber 104a and a vertically extending groove 196 in the bearing block 100a which is in alignment with the bore 194. Thus, each of the main bearings 143a can be lubricated by means of the oil gallery 78a and the respective bores 194, grooves 196 and 198 and chambers 104a. Similarly to the embodiment shown in FIGURES 1–4, each of the bearing block assemblies 26a is further maintained within the recess 98a in the transverse rib portion 64a by means of bolts 142a extending through bores 76a in boss portions 74a and threadably engaging the bearing block assemblies 26a. Note again that in respect to the aluminum alloy engine block 42a, the oil passageways can all be cored, thereby eliminating the need for any machining. Since the rest of the structure of the engine assembly 20a is similar to that as shown in FIGURES 1–4 and as previously described, the remaining portions will not be described here.

The structure of the engine block 42a shown in FIGURES 7 and 8 facilitates casting of the water jacket 82a and the cylinder bores 40a by pulling the die forming that structure out from the top rather than from the sides as with the embodiment shown in FIGURES 1–4.

Figure 9:
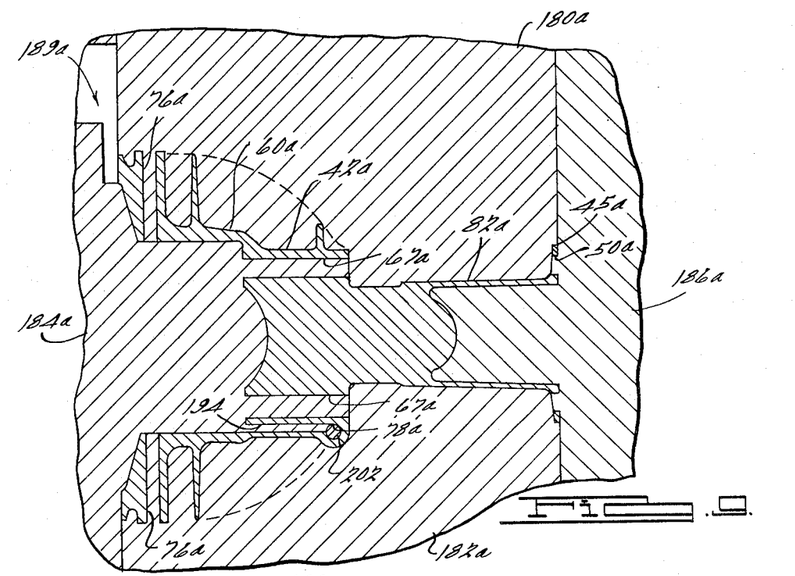
FIGURE 9 is a fragmentary view, with one portion of the engine block of FIGURES 7 and 8 shown in section, depicting the die casting of that engine block.
Figure 10:
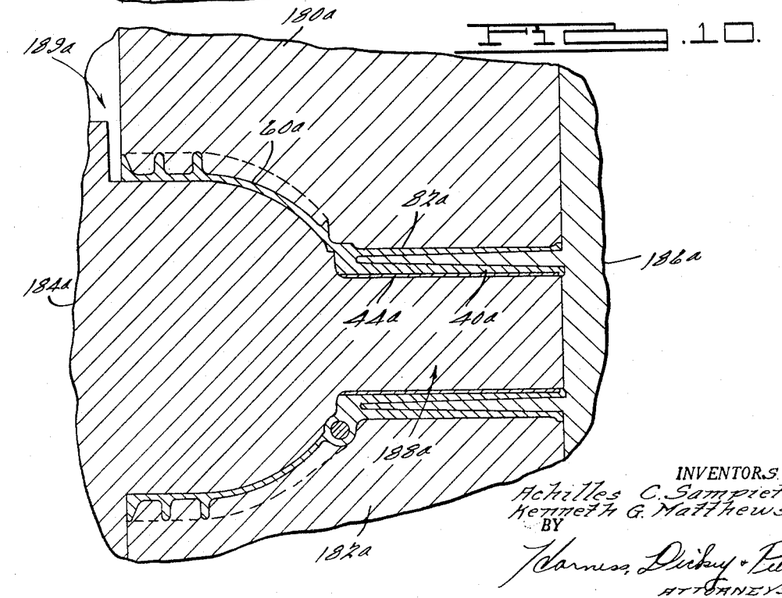
FIGURE 10 is a fragmentary view showing a different portion of the engine block as shown in FIGURES 7 and 8 in the die casting of that engine block.

Looking now specifically to FIGURES 9 and 10, an upper slide 180a and a lower slide 182a define the outer configuration of the water jackets 82a and the crankcase portion 60a with its associated ribbing and have cored therein the bores 76a for receiving the plurality of studs 142a (FIGURE 7). A stationary die section 184a cooperates with an ejector die section 186a to define the remainder of the die cast aluminum alloy engine block 42a. The stationary die section 184a which defines the internal portion of engine block 42a has secured to it a die mandrel portion 188a on which is located the internal cylinder bore lining 44a; thus the mandrel 188a, along with the bore liner 44a of cast iron or the like, defines the diameter of the cylinder bore 40a. The die section 184a also cores the plurality of vertically extending enlarged bores 67a through which the studs 108a and 108a' extend as well as the vertical bores 194 in communication with the longitudinally extending oil gallery 78a which is cored separately by a coring rod 202. The ejector die section 186a defines the internal configuration of the water jackets 82a and also the external diameter of the cylinder walls 40a. The upper and lower slides 180a and 182a also define the upper rim portion 45a while the ejector die section 186a cores the plurality of holes 50a through which the plurality of studs 108a and 108a' extend.

In die casting the cylinder block 42a as shown in FIGURES 9 and 10, the aluminum alloy is forced under pressure through a shot tube or gate generally indicated by the numeral 189a until the cavity between the upper slide 180a, the lower slide 182a, the stationary die section 184a and the ejector die section 186a is filled. On completion of the operation, the upper and lower slides 180 and 182 are parted and the ejector slide 186a is moved outwardly. The rod 202 used to core the longitudinal bore 78a forming the oil gallery is then removed, thus leaving the die cast block 42a.

Figure 11:
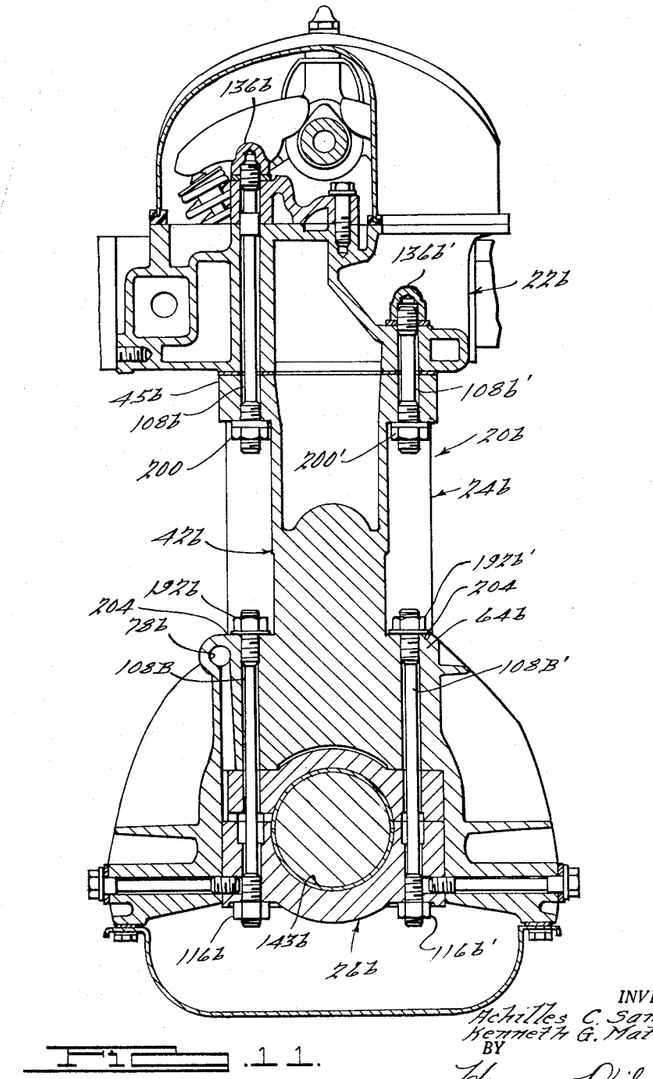
FIGURE 11 is a front elevational view with some parts in section and some parts shown broken away of another modified engine assembly embodying some of the features of this invention.

Still another modification of the engine assembly as shown in FIGURES 1–4 is shown in FIGURE 11. In this modification, components serving similar functions to like components of the embodiment shown in FIGURES 1–4 are given similar numbers with the suffix "b" added.

Looking now to FIGURE 11, an internal combustion engine assembly 20b comprises a cylinder head assembly 22b, an engine block assembly 24b, and a plurality of bearing block assemblies 26b, all vertically joined or clamped together in a sandwich-type arrangement by means of a plurality of studs. Instead of utilizing single studs similar to 108 and 108' to extend vertically through the engine assembly as shown in the embodiment depicted in FIGURES 1–4, pairs of studs 108b, 108B and 108b', 108B', respectively, are used. Thus the studs 108b and 108b' secure the cylinder head assembly 22b to the engine block assembly 42b while the studs 108B and 108B' secure each of the bearing block assemblies 26b to the engine block 42b.

The engine block 42b has an upper rim portion 45b in which the thickness and hence the strength of the bosses through which the studs 108b and 108b' extend has been increased in order to accommodate the load now applied thereto. Thus the cylinder head assembly 22b is secured to the engine block 42b of the block assembly 24b by means of nuts 136b, 136b', and the associated washers, threaded on one end of studs 108b and 108b', respectively, and by means of nuts 200, 200' and the associated washers, threaded on the opposite end of studs 108b and 108b'. Each of the bearing block assemblies 26b is secured or clamped to the engine block 42b by means of the studs 108B and 108B' which extend through inline bores in the transverse rib portion 64b and in that one of the bearing block assemblies 26b with which it is individual and by means of nut and lock washer assemblies 192b and 192b' threaded on one end of the studs and in engagement with external shoulders 204 on the transverse rib portion 64b and nuts 116b and 116b' threaded on the other end of the studs and bearing against that bearing block assembly 26b.

Note also in the construction as shown in FIGURE 11 that no load carrying connection is made by means of threads within the aluminum alloy die cast aluminum engine block 42b. The provision for the oil gallery 78b and for communication therefrom to the main bearing 143b is similar to that as shown and described with reference to the embodiment shown in FIGURE 7. In general then, the structure of the engine block 42b shown in FIGURE 11 is similar to that as shown in FIGURE 7 and could be cast by a method and apparatus similar to that described in conjunction with FIGURES 8 and 9.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An engine assembly comprising an engine block assembly including an engine block having an upper rim portion and a plurality of transversely extending lower rib portions each defining a recess at its lower extremity, each of a plurality of bearing block assemblies having a bearing block member, a bearing cap, and a main bearing member disposed therebetween and being individual to one of said plurality of rib portions and matably disposed within said recess defined therein; a cylinder head assembly disposed upon said upper rim portion; and clamping means including a plurality of studs extending through aligned bores in said cylinder head assembly, said engine block, and said bearing block assemblies and means independent of and removed from said engine block being engageable with said plurality of studs for clamping said bearing block assemblies and said cylinder head assembly to said engine block.

2. The engine assembly of claim 1 further including pairs of bolts individual to each of said plurality of bearing block assemblies and extending through transverse bores in said engine block with each of said bolts having one end bearing against said engine block and the other end threadably engaging that one of said plurality of bearing block assemblies with which it is individual.

3. An engine assembly comprising an engine block assembly including an engine block having an upper rim portion and a plurality of transversely extending lower rib portions each having a pair of spaced bores extending vertically therethrough and each defining a recess at its lower extremity, said engine block having a longitudinally extending oil gallery for the transmission of a lubricating fluid; each of a plurality of bearing block assemblies having a main bearing member and being individual to one of said plurality of lower rib portions and matably disposed within said recess defined therein, passage means in each of said bearing block assemblies and in said engine block for fluid communicating said oil gallery with said main bearing member in each of said bearing block assemblies; a cylinder head assembly disposed upon said upper rim portion; and clamping means including a plurality of studs extending through said spaced bores in said rib portions and means independent of and separate from said engine block being engageable with said plurality of studs for clamping said bearing block assemblies and said cylinder head assembly to said engine block.

4. An engine assembly comprising an engine block assembly including an engine block having an upper rim portion and a plurality of transversely extending lower rib portions each having a pair of spaced bores extending vertically therethrough and each defining a recess at its lower extremity, said engine block having a longitudinally extending slot opening outwardly on one side of said engine block, passage means in said engine block connecting said slot with those of said spaced bores on said one side of said engine block, and removable water jacket members disposed on opposite sides including said one side of said engine block to define therein a chamber for the circulation of coolant, that one of said water jacket members on said one side of said engine block disposed in sealing relationship with said slot thereby defining an oil gallery for the transmission of a lubricating fluid within said engine block; each of a plurality of bearing block assemblies having a main bearing member and being individual to one of said plurality of lower rib portions and matably disposed within said recess defined therein, each of said bearing block assemblies having a passageway communicating that one of said spaced bores on said one side of said engine block with which it is individual with said main bearing member; a cylinder head assembly disposed upon said upper rim portion; and clamping means including a plurality of studs extending through said spaced bores in said lower rib portions and means independent of and separate from said engine block being engageable with said plurality of studs for clamping said bearing block assemblies and said cylinder head assembly to said engine block, portions of each of those of said plurality of studs extending through those of said spaced bores on said one side of said engine block being of a predetermined cross sectional area relative to the cross sectional area of said spaced bores to provide clearance therebetween for the passage of the lubricating fluid from said oil gallery.

5. An engine assembly comprising an engine block assembly including an engine block having an upper rim portion and a plurality of transversely extending lower rib portions each having a pair of spaced bores extending vertically therethrough and each defining a recess at its lower extremity, oil gallery means extending longitudinally in said engine block for the transmission of a lubricating fluid and being connected with those of said spaced bores on said one side of said engine block; each of a plurality of bearing block assemblies having a main bearing member and being individual to one of said plurality of rib portions and matably disposed within said recess defined therein, each of said bearing block assemblies having a passageway communicating that one of said spaced bores on said one side of said engine block with which it is individual with said main bearing member; a cylinder head assembly disposed upon said upper rim portion; a plurality of studs extending through said spaced bores in said rib portions and through aligned bores in said cylinder head assembly and said bearing block assembly; and means independent of and separate from said engine block being engageable with said plurality of studs for clamping said bearing block assemblies, said cylinder head assembly and said engine block assembly together.

6. The engine assembly of claim 5 with those of said plurality of studs extending through said spaced bores on said one side of said engine block being of a predetermined cross sectional area relative to the cross sectional area of said spaced bores to provide clearance therebetween for the passage of the lubricating fluid.

7. An engine assembly comprising an engine block assembly including an engine block having an upper rim portion and a plurality of transversely extending lower rib portions each defining a recess at its lower extremity, each of a plurality of bearing block assemblies having a bearing block member, a bearing cap, and a main bearing member disposed therebetween and being individual to one of said plurality of rib portions and matably disposed within said recess defined therein, a cylinder head assembly disposed upon said upper rim portion; a plurality of studs each extending through aligned bores in said cylinder head assembly, said engine block, and said bearing block assembly, and means independent of and separate from said engine block being engageable with said plurality of studs for clamping said bearing block assemblies, said cylinder head assembly, and said engine block assembly together.

8. The engine assembly of claim 7 in which each of said plurality of studs has an enlarged head portion intermediate its ends for engagement with a shoulder on that one of said lower rib portions with which it is individual.

9. The engine assembly of claim 8 in which said enlarged head portion is multifaced peripherally and seated in a similarly multifaced recess on said shoulder.

10. An engine assembly comprising an engine block assembly including an engine block having an upper rim portion and a plurality of transversely extending lower rib portions each defining a recess at its lower extremity; each of a plurality of bearing block assemblies having a main bearing member and being individual to one of said plurality of rib portions and matably disposed within said recess defined therein; a cylinder head assembly disposed upon said upper rim portion; a first plurality of studs extending through aligned bores in said cylinder head assembly and said engine block; means independent of and separate from said engine block being engageable with said first plurality of studs at the opposite ends thereof for clamping only said cylinder head assembly and said engine block assembly together; a second plurality of studs extending through aligned bores in each of said bearing block assemblies and said engine block; and means independent of and separate from said engine block being engageable with said second plurality of studs at the opposite ends thereof for clamping only said bearing block assemblies and said engine block assemblies together.

11. An engine assembly comprising an engine block assembly including an engine block of a lightweight metal comprising a plurality of in-line vertically upwardly extending cylinder bores each having a cylindrical cast iron sleeve secured therein, an upper rim portion having a plurality of bores therethrough and connected to an upper portion of each of said cylinder bores by a web portion, a lower web portion externally interconnecting each of said cylinder bores at a lower portion thereof, an outwardly extending crankcase portion integral with said lower web portion, a plurality of transversely extending lower rib portions disposed in said crankcase portion each defining a recess at its lower extremity and each having a pair of spaced bores extending vertically therethrough, each of said spaced bores being individual to and in axial alignment with one of said plurality of bores in said upper rim portion, said engine block having a longitudinally extending slot opening outwardly on one side thereof, and each of a plurality of passageways interconnecting said slot with those of said spaced bores on said one side, and including removable water jacket members disposed on opposite sides including said one side of said engine block to define therein a chamber for the circulation of a coolant, that one of said water jacket members on said one side of said engine block disposed in sealing relationship with said slot thereby defining an oil gallery for the transmission of a lubricating fluid within said engine block; each of a plurality of bearing block assemblies having a main bearing member and being individual to one of said plurality of lower rib portions and matably disposed within said recess defined therein, each of said bearing block assemblies having a passageway communicating that one of said spaced bores on said one side of said engine block with which it is individual with said main bearing member; a cylinder head assembly disposed on said upper rim portion; clamping means extending through said spaced bores in said lower rib portions; and means independent and separate from said engine block being engageable with said clamping means for clamping said bearing block assemblies and said cylinder head assembly to said engine block, portions of each of those of said plurality of studs extending through those of said spaced bores on said one side of said engine block being of a predetermined cross sectional area relative to the cross sectional area of said spaced bores to provide clearance therebetween for the passage of the lubricating fluid from said oil gallery.

12. An engine assembly comprising an engine block assembly including an engine block of a lightweight metal comprising a plurality of in-line vertically upwardly extending cylinder bores each having a cylindrical cast iron sleeve secured therein, a pair of vertically upwardly extending water jacket walls disposed on opposite sides of said plurality of said cylinder bores, an upper rim portion having a plurality of bores therethrough and connected to said water jacket walls, a lower web portion externally interconnecting each of said cylinder bores at a lower portion thereof, an outwardly extending crankcase portion integral with said lower web portion, a plurality of transversely extending lower rib portions disposed in said crankcase portion each defining a recess at its lower extremity and each having a pair of spaced bores extending vertically therethrough, each of said spaced bores being individual and in axial alignment with one of said plurality of bores in said upper rim portion, one side of said engine block having a longitudinally extending bore, and each of a plurality of vertical bores disposed in said lower rib portions on said one side of said engine block in communication with said longitudinally extending bore; each of a plurality of bearing block assemblies having a main bearing member and being individual to one of said plurality of rib portions and matably disposed within said recess defined therein; each of said bearing block assemblies having a passageway communicating that one of said spaced bores on said one side of said engine block with which it is individual with said main bearing member in each of said bearing block assemblies; a cylinder head assembly disposed upon said upper rim portion; a plurality of studs extending through aligned bores in said cylinder head assembly, said engine block and said bearing block assembly; and means independent of and separate from said engine block being engageable with said plurality of studs for clamping said bearing block assemblies, said cylinder head assembly and said engine block assembly together.

13. An engine block comprising a plurality of in-line vertically upwardly extending cylinder bores each having a cylindrical cast iron sleeve secured therein, an upper rim portion having a plurality of bores therethrough and connected to an upper portion of each of said cylinder bores by a web portion, a lower web portion externally interconnecting each of said cylinder bores at a lower portion thereof, an outwardly extending crankcase portion integral with said lower web portion, a plurality of transversely extending lower rib portions disposed in said crankcase portion each defining a recess at its lower extremity for receiving a bearing block assembly and each having a pair of spaced bores extending vertically therethrough, each of said spaced bores being individual to and in axial alignment with one of said bores in said upper rim portion, one side of the engine block having a longitudinally extending slot opening outwardly, and each of a plurality of passageways interconnecting said slot with those of said spaced bores on said one side.

14. An engine block comprising a plurality of in-line vertically upwardly extending cylinder bores each having a cylindrical cast iron sleeve secured therein, a pair of vertically upwardly extending water jacket walls disposed on opposite sides of said plurality of cylinder bores, an upper rim portion having a plurality of bores therethrough and connected to said water jacket walls, a lower web portion externally interconnecting each of said cylinder bores at a lower portion thereof, an outwardly extending crankcase portion integral with said lower web portion, a plurality of transversely extending lower rib portions disposed in said crankcase portion each defining a recess at its lower extremity for receiving a bearing block assembly and each having a pair of spaced bores extending vertically therethrough, each of said spaced bores being individual to and in axial alignment with one of said bores in said upper rim portion, one side of the engine block having a longitudinally extending bore, and each of a plurality of vertical bores being disposed in said lower rib portions on said one side of said engine block and communicating with said longitudinally extending bore.

References Cited by the Examiner

UNITED STATES PATENTS

| | | | |
|---|---|---|---|
| 1,229,709 | 4/19 | Hall | 121—194 |
| 1,301,740 | 4/19 | Pullinger | 123—41.81 |
| 1,416,170 | 5/22 | Cattaneo | 123—41.81 |
| 1,529,812 | 3/25 | Reineke | 123—41.82 |
| 1,720,625 | 7/29 | Chorlton | 123—195 |
| 1,969,690 | 8/34 | Church | 123—195 |
| 1,972,752 | 9/34 | Balough | 123—195 |
| 2,011,642 | 8/35 | Loeffler | 29—156.4 |
| 2,018,612 | 10/35 | Good et al. | 123—195 |
| 2,102,662 | 12/37 | Wurtele | 123—41.81 |
| 2,382,303 | 8/45 | Fawick | 29—156.4 |
| 2,674,988 | 4/54 | Evans et al. | 123—193 |
| 2,681,054 | 6/54 | Boghossian | 123—195 |
| 2,685,282 | 8/54 | Seitz | 123—195 |
| 2,739,574 | 3/56 | Scheiterlein | 123—195 X |
| 3,046,952 | 7/62 | Dolza | 123—195 X |

FRED E. ENGELTHALER, *Primary Examiner.*

KARL J. ALBRECHT, *Examiner.*

UNITED STATES PATENT OFFICE
CERTIFICATE OF CORRECTION

Patent No. 3,173,407            March 16, 1965

Achilles C. Sampietro et al.

It is hereby certified that error appears in the above numbered patent requiring correction and that the said Letters Patent should read as corrected below.

Column 2, line 28, for "combusion" read -- combustion --; line 29, for "designed" read -- designated --; column 3, line 18, for "engine block 52" read -- engine block 42 --; column 7, lines 48 and 49, strike out "having cast therein liners 44a of cast iron or some other similar material. The plurality of cylinder bores 40a"; line 72, for "in" read -- on --; column 14, line 19, for "1,229,709" read -- 1,299,709 --.

Signed and sealed this 3rd day of August 1965.

(SEAL)
Attest:

ERNEST W. SWIDER            EDWARD J. BRENNER
Attesting Officer            Commissioner of Patents